(12) United States Patent
Kuwabara

(10) Patent No.: US 7,008,107 B2
(45) Date of Patent: Mar. 7, 2006

(54) LINEAR MOTION GUIDE UNIT

(75) Inventor: Hideki Kuwabara, Gifu-ken (JP)

(73) Assignee: Nippon Thompson Co., Ltd., Tokyo (JP)

( * ) Notice: Subject to any disclaimer, the term of this patent is extended or adjusted under 35 U.S.C. 154(b) by 272 days.

(21) Appl. No.: 10/437,380

(22) Filed: May 14, 2003

(65) Prior Publication Data

US 2003/0215167 A1   Nov. 20, 2003

(30) Foreign Application Priority Data

May 14, 2002   (JP) .............................. 2002-137970

(51) Int. Cl.
*F16C 29/06* (2006.01)
*F16C 29/04* (2006.01)

(52) U.S. Cl. .............................. 384/45; 384/43; 384/49

(58) Field of Classification Search ................. 384/43, 384/45, 49, 59, 20, 21, 520, 521
See application file for complete search history.

(56) References Cited

U.S. PATENT DOCUMENTS

| | | | | |
|---|---|---|---|---|
| 3,185,530 A | * | 5/1965 | Hahn et al. ..................... | 384/21 |
| 4,582,371 A | * | 4/1986 | Mottate ........................ | 384/45 |
| 4,647,226 A | * | 3/1987 | Mottate ........................ | 384/45 |
| 4,701,057 A | * | 10/1987 | Kashiwabara ................ | 384/45 |
| 4,701,058 A | * | 10/1987 | Mottate ........................ | 384/45 |
| 4,778,284 A | * | 10/1988 | Teremachi .................... | 384/45 |
| 4,799,806 A | * | 1/1989 | Seki ............................. | 384/45 |
| 4,806,022 A | * | 2/1989 | Takahiro ....................... | 384/45 |
| 4,832,509 A | * | 5/1989 | Merrifield .................... | 384/21 |
| 4,892,415 A | * | 1/1990 | Katahira ....................... | 384/45 |
| 5,395,170 A | | 3/1995 | Tamura et al. | |
| 5,518,317 A | | 5/1996 | Osawa | |

FOREIGN PATENT DOCUMENTS

| | | |
|---|---|---|
| GB | 1 302 026 A | 1/1973 |
| JP | 130017/1982 | 8/1982 |
| JP | 37621/1987 | 3/1987 |
| JP | 200363/1996 | 8/1996 |
| JP | 2948944 | 7/1999 |

* cited by examiner

*Primary Examiner*—David A. Bucci
*Assistant Examiner*—Colby Hansen
(74) *Attorney, Agent, or Firm*—Browdy and Neimark, PLLC

(57) ABSTRACT

A linear motion guide unit has a guide rail made of a thin plate, and a stopper construction installed detachably to the guide rail to prevent a slider from becoming untethered while on a sliding movement relative to the guide rail. A linear motion guide unit is disclosed in which a slider fits for linearly sliding movement in a guide rail made of a thin steel material formed in an U-shape in cross section, and there is provided a stopper construction to keep the slider against getting out of the guide rail. The stopper construction is comprised of a stopper pin installed detachably to the guide rail at any lengthwise end thereof to cause the stopper pin to bear against any fore-and-aft end of widthwise opposing side walls of the slider, whereby the slider comes to rest to prevent it from becoming untethered from the guide rail.

12 Claims, 9 Drawing Sheets

(A) (B)

LINEAR MOTION GUIDE UNIT

BACKGROUND OF THE INVENTION

1. Field of the Invention

The present invention relates to a linear motion guide unit having wide application in sliding parts incorporated in, for example, semiconductor manufacturing equipments, various assembling machines, numerical control (NC) processors, measurement/testing instruments, and so on. More particularly, it relates to a linear motion guide unit in which a slider is forced to move lengthwise relative to a track rail.

2. Description of the Prior Art

Linear motion guide units have been universally recognized for fundamental and versatile means to more encourage the recently remarkable growth of mechatronics. Although the linear motion guide units have been extensively built in machinery in fields as diverse as semiconductor manufacturing equipments, a variety of assembling machines, numerical control (NC) processors, measurement/testing instruments, and so on, the expansion of uses accompanied by the current developments in advanced technologies requires more and more such linear motion guide units that can manage growing demands for shrinkage in size, weight reduction, high precision, low-frictional resistance, high-speed moving, easy assemblage, versatility and the like.

There is conventionally known a linear motion guide unit of the sort disclosed in, for example Japanese Utility Model Laid-Open No. 37621/1987, which is a co-pending application filed by the present assignee. With the prior linear motion guide unit in which a table fits for linearly sliding movement in a guide way made of a thin steel material formed in an U-shape in cross section, there are provided stoppers to keep the moving table against getting out of the guide way. The stoppers are provided by forward and aft bent ends of the guide way as shown in FIG. 1 of the document referred to earlier. The moving table could be protected from any runaway out of the guide way after any one of forward and aft end caps on the moving table has come in abutment against the associated stopper. Should the table get out of the guide way, rolling elements would fall apart from one another. As an alternative shown in FIG. 4 of the reference document, the stoppers of tiny plate are secured with fastening screws on forward and aft ends of the guide way, one to each end. With this alternative, the table is also made to come in engagement at any one of its forward and aft ends with the associated stopper as shown in FIG. 5 of the reference document. Besides, this alternative is made in such construction that the rolling elements are not allowed to run in recirculating way.

With the prior stopper stated earlier to keep the table against getting out of the guide way of the thin steel member formed in an U-shape in cross section, however, it is needed to go to the trouble of making any extra part that should be bent. The table would be hard to fit in the guide way, once the extra parts got bent to provide the stoppers. The alternative stopper of tiny plate secured with fastening screws on the guide way needs a number of parts, and therefore takes up relatively much space. In contrast, the advanced technology looks to shrink the stopper down to make the linear motion guide unit compact in construction.

In Japanese Patent No. 2948944, which is also a co-pending application filed by the present assignee, another sort of linear motion guide unit is disclosed, in which any one of members confronting one another for sliding relative movement, as shown in FIG. 1 of the reference document is made therein with a lengthwise slot while the other has a stopper pin extending to fit in the slot. This prior construction allows leaving any specific stopper mechanism out of the linear motion guide unit. Since the stopper construction for the linear motion guide unit referred to earlier needs to cut the lengthwise slot in the fixed second member, however, it would be very tough to cut the lengthwise slot in a guide rail slim in thickness or make the stopper construction extending across the entire width of the linear motion guide unit. This means that this prior stopper construction is applicable to large linear motion guide units, but hardly suited for small guide unit especially slim or thin in thickness.

Japanese Utility Model Laid-Open No. 130017/1982, which is also a co-pending application filed by the present assignee, discloses another linear motion guide unit of cross-roller way type, in which rolling elements, as shown in FIGS. 1 and 2 of the reference document, are allowed to roll over only a definite travel instead of rolling through a recirculating circuit. This linear motion guide unit is mainly composed of a bed, table, and guide rails for the bed and the table, all of which are made of steel material. As seen from FIG. 1 of the reference document where the table is partially cut away, a stopper is constituted with first bolts fastened inside the table at the widthwise middle near forward and aft ends of the table, and a second bolt fastened on the upper surface of the guide rail for the bed midway between the first bolts inside the table so as to come in collision against the first bolts. The stopper in the linear motion guide unit of cross-roller way type recited earlier, because of being constituted with just bolts, is simple in construction, but needs much space to fasten the bolts underneath the table. Thus, this prior stopper construction would be also suited for only the relatively large linear motion guide units.

In Japanese Patent Laid-Open No. 200363/1996 there is disclosed lubricating means for the linear motion guide unit in which the track rail has no stopper construction to have the slider come to rest at any lengthwise end of the guide rail. This prior disclosure, although doing with the linear motion guide unit made smaller in construction, but does not involve technical concept about how to install the stopper construction to get the slider come to rest at any lengthwise end of the guide rail. The stopper construction, if necessary, may be as simple as any tentative stoppers extending between the raceway grooves at the lengthwise ends of the guide rail.

With linear motion guide unit to be made shrunken in size and compact in construction where both the slider and the guide rail are made slim or thin in thickness, it still remains a major challenge to realize how to provide a stopper construction to keep a slider against getting out of the guide way, especially, protecting the small rolling elements against falling apart from one another, which would occur when the slider became untethered from the guide rail while on a linear movement.

SUMMARY OF THE INVENTION

The present invention, therefore, has as its primary object to solve the major challenge as described just above and more particular to provide a linear motion guide unit shrunken down sufficiently to fit it into a variety of machines including inspection and testing instruments, semiconductor manufacturing equipments, and so on. Moreover, the present invention provides a stopper construction compliable with very small linear motion guide unit that is constituted with a guide rail and a slider both of which are made of plate members slim in thickness. With the stopper construction of the present invention, there are provided stopper pins so most simple in construction as to allow attaching and/or detaching with ease them from the guide rail at forward and aft ends of the guide rail, one to each end, while the slider is made to cause the stoppers to bear against any one of forward and aft ends themselves on a casing of the slider without any specific part being provided to bear against the stoppers.

The present invention is concerned with a linear motion guide unit comprising; a guide rail of plate member slim in thickness formed to have a bottom and first side walls extending lengthwise along widthwise opposite sides of the bottom, one to each side, the first side walls being made on their inside surfaces with first raceway grooves extending lengthwise, one to each inside surface, and a slider fit for linear movement in between the first side walls widthwise opposite to one another, the slider being provided on sidewise outside surfaces thereof with second raceway grooves, one to each outside surface, which are in opposition to the first raceway grooves to define load raceways between them to allow rolling elements to run through there, whereby the slider is movable in a sliding manner between the first side walls of the guide rail by virtue of the rolling elements; and wherein a stopper construction is installed detachably to any one of forward and aft ends of the guide rail once the slider has fit in the guide rail, so that the slider comes into abutment against the stopper construction while on a movement, thereby being prevented from becoming untethered from the guide rail.

Here the wording "once the slider has fit in the guide rail" means every situation: for example, while on linear movement of the slider with respect to the guide rail, at the time of assembling the slider with the guide rail, at the time when the linear motion guide unit is transported or in storage, and so on.

In an aspect of the present invention, a linear motion guide unit is disclosed in which the stopper construction is comprised of a stopper pin that fits in a hole and/or a threaded hole formed in a plane surface of the bottom of the guide rail, with a part of the stopper pin being raised above the hole. In another aspect of the present invention, a linear motion guide unit is disclosed in which the stopper pin for the stopper construction is a screw of a pan head having a rounded surface of the top of the head.

In another aspect of the present invention, a linear motion guide unit is disclosed in which the slider has a casing of a thin plate formed in an U-shape in cross section, which is composed of a top portion and second side walls bent along widthwise opposite sides of the top portion to head downwards, and wherein the second raceway grooves are cut in sidewise outside surfaces of the second side walls.

In another aspect of the present invention, a linear motion guide unit is disclosed in which the stopper pin for the stopper construction is installed to the guide rail in relation to bear against any one end of the second side walls of the casing, so that the slider comes to rest to be kept against becoming untethered from the guide rail while on a movement. In a further another aspect of the present invention, there is disclosed a linear motion guide unit in which the stopper pins for the stopper construction attached to the guide rail are placed on the bottom of the guide rail along linear lines lying on traveling paths of the widthwise opposing second side walls of the casing, with located in a preselected relation to one another, in which they lie on any diagonal line of a plane surface of the bottom at lengthwise opposite ends of the guide rail.

In another aspect of the present invention, a linear motion guide unit is disclosed in which the slider is composed of the casing and a circulator laid underneath the casing, which is provided therein with non-loaded areas, each of which includes therein turnarounds communicating with the associated load raceway defined between the raceway grooves confronting one another, and a return passage connecting the turnarounds with each other, and wherein the rolling elements are allowed to run through a recirculating circuit comprised of the load raceway, turnarounds and return passage.

In another aspect of the present invention, a linear motion guide unit is disclosed in which the circulator is made concaved on a lower surface thereof to form a recess extending along a fore-and-aft area corresponding with the stopper pin for the stopper construction so as to allow the stopper pin to go by underneath the slider without any interference between them. In a further another aspect of the present invention, there is disclosed a linear motion guide unit in which the circulator is comprised of upper and lower circulator halves of synthetic resin, which are made therein with grooves semicircular in cross section to produce the turnarounds and the return passages that are circular in cross section to render them suitable for the rolling elements of balls.

In another aspect of the present invention, a linear motion guide unit is disclosed in which the threaded hole made in the guide rail to fit on the stopper pin doubles as a threaded hole used to fasten the guide rail to any stationary structure including a machine bed and so on.

In another aspect of the present invention, a linear motion guide unit is disclosed in which the circulator is provided underneath the lower surface thereof with a fore-and-aft recess, which lies sidewise midway area to cause no interference with a screw that is used to fasten the guide rail to any stationary structure including a machine bed and so on. In a further another aspect of the present invention, there is disclosed a linear motion guide unit in which the slider is made with a threaded hole used to fasten any part including works and so on thereto.

In another aspect of the present invention, a linear motion guide unit is disclosed in which the casing is integrated with the circulator in a way that the widthwise opposite second side walls of the casing fit in the sidewise recesses of the circulator, one to each recess, which are made over the middle areas of the widthwise opposing sides save the lengthwise opposite ends of the circulator.

In another aspect of the present invention, a linear motion guide unit is disclosed in which the casing is positioned in alignment with the circulator in a way that a hole made in the casing fits over a tenon raised above a top surface of the circulator.

In a further another aspect of the present invention, there is disclosed a linear motion guide unit in which the circulator has a hole while the casing has a hole used for riveting, which is made in alignment with the hole in the circulator, and wherein the casing is joined together with the circulator, using riveting.

With the linear motion guide unit of the present invention constructed as stated earlier, just a simple stopper construction is able to serve certainly the purpose that the slider is kept against becoming untethered from the guide rail while on a linear movement, even the small linear motion guide unit in which both the guide rail and the slider are made of plate members slim or thin in their thickness. Moreover, the stopper construction is made detachable from the guide rail. Thus, the stopper construction is made after the slider has fit in the guide rail. In contrast, the slider can be withdrawn out of the guide rail after the stopper construction has been taken apart from the guide rail.

With the linear motion guide unit of the present invention constructed as stated earlier, moreover, the slider can come into collision against the stopper constructions made on the guide rail at the forward and aft ends thereof, thereby coming to rest to be kept against becoming untethered from the guide rail while on a sliding movement relative to the guide rail. The stopper construction of the present invention, as being made of just stopper pin screwed into the threaded hole in the guide rail, may help make very small linear motion guide unit that is suited for small machines. Moreover, the stopper construction of the present invention makes sure of stopping the slider, even inexpensive in production.

Eventually, the stopper construction of the present invention helps built the smaller linear motion guide unit that is applied well to a variety of machines including semiconductor manufacturing equipments, inspection instruments, measuring instruments, processors, assembling machines, and so on to move machines with accuracy in a sliding manner.

DETAILED DESCRIPTION OF THE PREFERRED EMBODIMENTS

Figure 1:
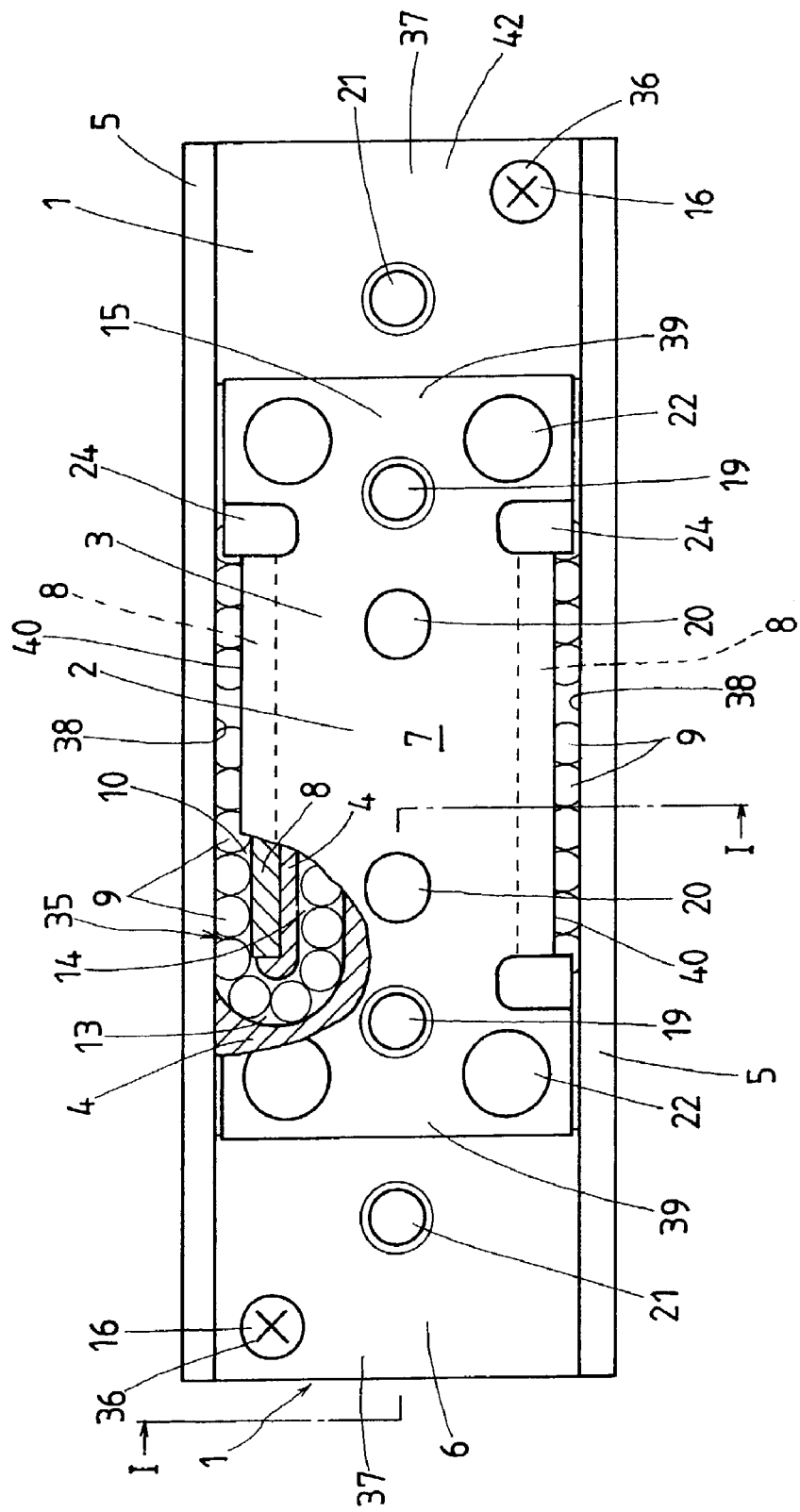
FIG. 1 is a top plan view, partially broken away, showing a preferred embodiment of a linear motion guide unit in accordance with the present invention.
Figure 2:
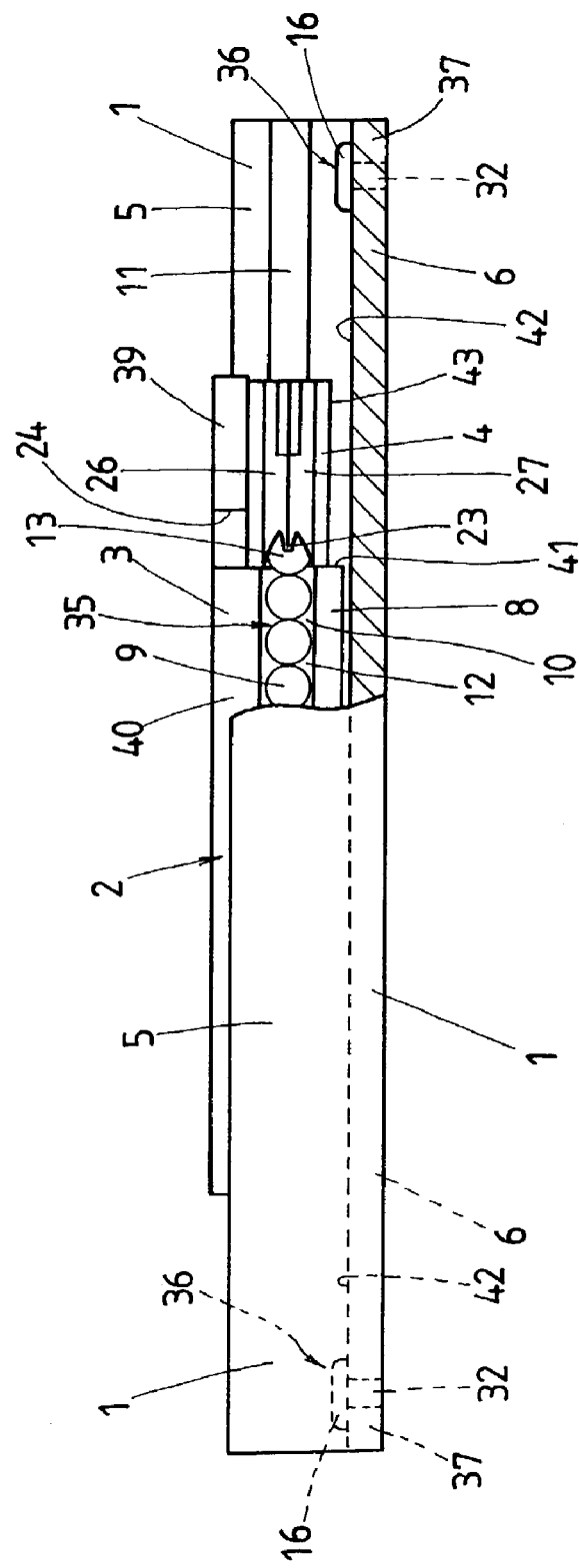
FIG. 2 is a front elevation, partially cut away, of the linear motion guide unit of FIG. 1.
Figure 3:
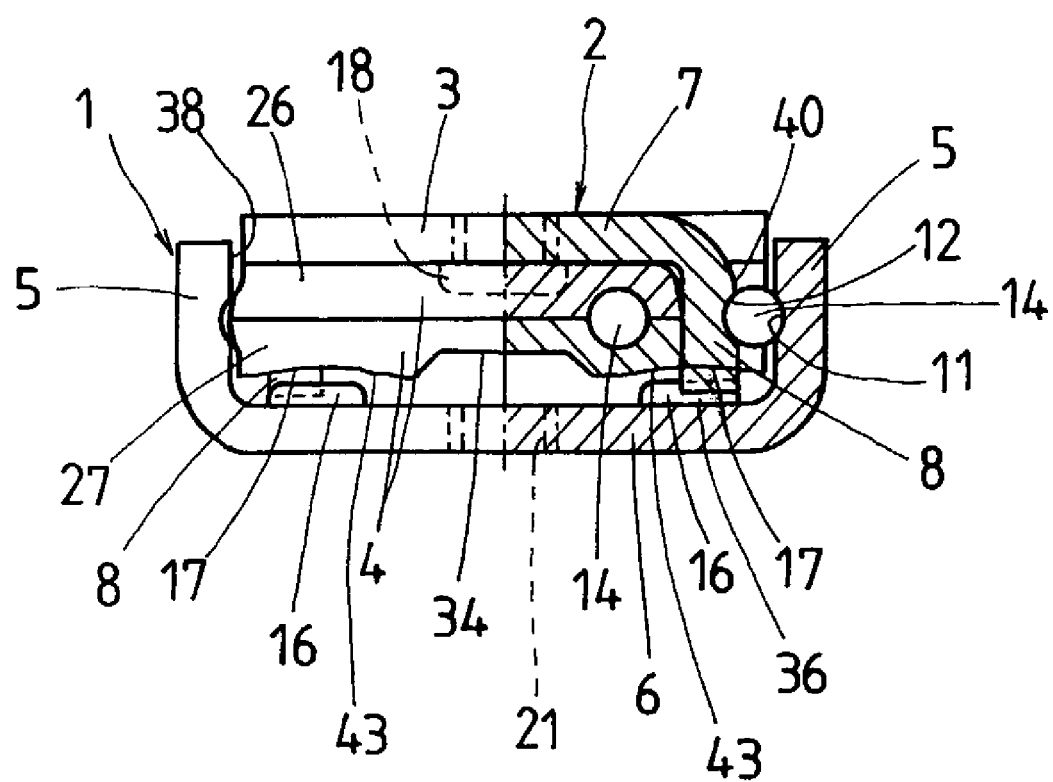
FIG. 3 is a side elevation of the linear motion guide unit shown in FIG. 1, the view being taken on the planes of the lines I—I of that figure to illustrate in cross section the reader's right half, as seen into the interior.

A preferred embodiment of a linear motion guide unit according to the present invention will be explained hereinafter in detail with reference to the accompanying drawings. The linear motion guide unit of the present invention is envisaged to use it in sliding parts incorporated in, for example, semiconductor manufacturing equipment, various assembling machines, numerical control (NC) machines, measuring/testing instruments, inspection machines, and so on, and thus comprised of an elongated guide rail 1 made of a plate member thin in thickness, and a slider 2 allowed traveling lengthwise with respect to the guide rail 1, the slider 2 being also made of a assembly of slim plate members. What both the guide rail 1 and the slider 2 are made of plate members slim in thickness helps shrink more the linear motion guide unit down in size. The linear motion guide unit of the present invention is envisaged to prevent the slider 2 against getting untethered from the guide rail 1 while on a linear movement. To cope with this, stopper constructions 36 are fastened in a detachable manner to the guide rail 1 at forward and aft ends of the guide rail 1 in the adjacency of at least any one of widthwise opposite sides of the guide rail 1. Thus, the slider 2, after having reached any one of the lengthwise opposite ends of the guide rail 1, is caused any associated one of the forward and aft ends of the slider 2 to bear against the associated stopper construction 36, eventually coming to rest at an extreme position where the slider 2 is still kept against getting untethered.

The linear motion guide unit is principally comprised of the elongated guide rail 1 of plate member slim in thickness formed to have a bottom 6 and first side walls 5 extending lengthwise along widthwise opposite sides of the bottom 6, one to each side, the side walls 5 being made on their inside surfaces 38 with first raceway grooves 11 extending lengthwise, one to each inside surface, and the slider 2 fit for linear movement in between the widthwise opposite side walls 5, the slider 2 being provided on sidewise outside surfaces 40 thereof with second raceway grooves 12, one to each outside surface, which are in opposition to the first raceway grooves 11 to define load raceways 10 between them to allow rolling elements or balls 9 to run through there.

This elongated guide rail 1 is made of a metal plate material, which is bent along widthwise opposite sides thereof to a specific angle or U-shape in cross-section having the side walls 5. The slider 2 is constituted with many thin plate members combined together, only the top plate 7 of which is bent along widthwise opposite sides 8 thereof save lengthwise opposite ends 39 to a right angle heading downwards. That is to say, the top plate 7 is bent at the widthwise opposite sides 8 save forward and aft preselected areas so as to make second side walls 8, thereby providing a casing 3 of thin metal plate formed in an U-shape in cross section. The second raceway grooves 12 in the embodiment discussed here are cut in the sidewise outside surfaces 40 of the second side walls 8, with extending over almost entire length thereof. Moreover, the top plate 7 is cut away at 24 to separate the major sides walls 8 from the forward and aft ends 39 to make bending of the side walls 8 much easier.

Especially, the linear motion guide unit according to the present invention features that the slider 2, while traveling relatively to the guide rail 1 after once it has fit in the guide rail 1, is caused to bear against any one of the stopper constructions 36 fastened in a detachable manner to the guide rail 1, thus, coming to rest at an extreme position where the slider 2 is still kept from escape out of the guide rail 1. Here the wording "once the slider 2 has fit in the guide rail 1" means every situation: for example, while on linear movement of the slider 2 with respect to the guide rail 1, at the time of assembling the slider 2 with the guide rail 1, at the time when the linear motion guide unit is transported or in storage, and so on.

Moreover, the stopper construction 36 is made up of a hole or threaded hole 32 produced in the bottom 6 of the guide rail 1, and a stopper pin 16 having external threads that fit in the hole or threaded hole 32. With stopper constructions in the embodiment discussed here, the threaded stopper pins 16 are screwed into the threaded holes 32 made in the bottom 6 of the guide rail 1.

When the stopper pin 16 fastened to the guide rail 1 collides or comes into abutment against any one of forward and aft ends 41 of the side walls 8 of the casing 3, the slider 2 can come to rest with respect to the guide rail 1 so as to remain tethered to the guide rail 1 without getting escaped out of the guide rail 1. That is to say, the stopper construction to protect the slider 2 against becoming untethered or escaping out of the guide rail 1 is made such that the slider 2 will come to rest just when any one of the lengthwise opposite ends 39 on the side walls 8 of the casing 3 of the slider 2, as seen from FIGS. 4(A) and 4(B), has been caused to come into abutment against the associated any one of the stopper pins 16 installed on the guide rail 1 at the forward and aft ends 37 thereof.

Figure 4:
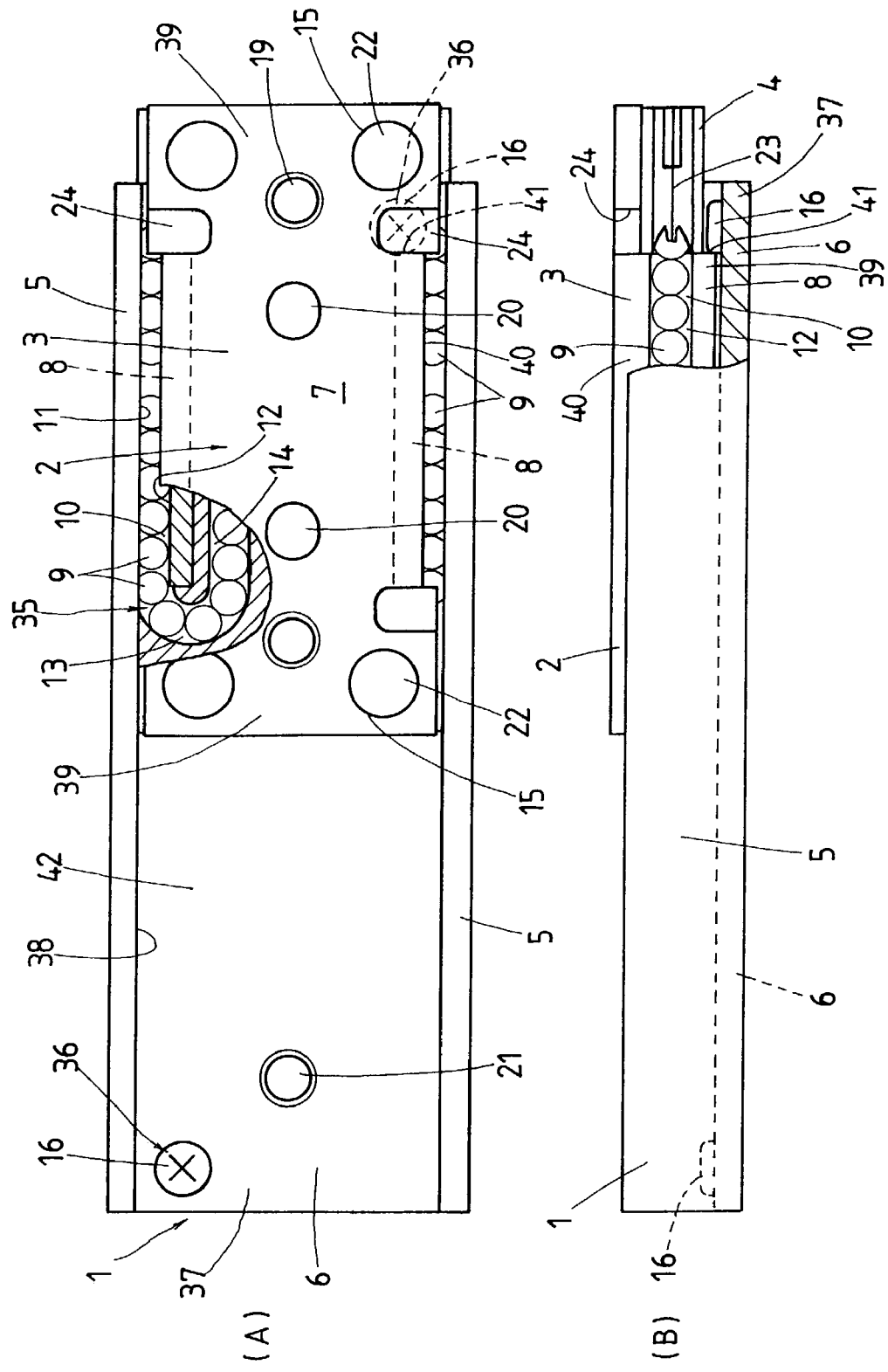
FIGS. 4(A) and 4(B) are a top plan view and a front view, respectively, of the linear motion guide unit of FIG. 1 to illustrate a phase where a slider is kept against escape out of a guide rail after having moved relatively to the guide rail from another phase shown in FIG. 1.
Figure 5:
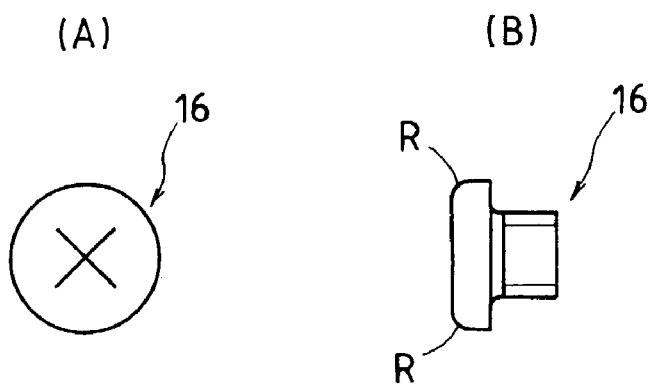
FIGS. 5(A) and 5(B) are a front elevation and a side elevation, respectively, of a stopper bolt used in the linear motion guide unit shown in FIG. 1.
Figure 6:
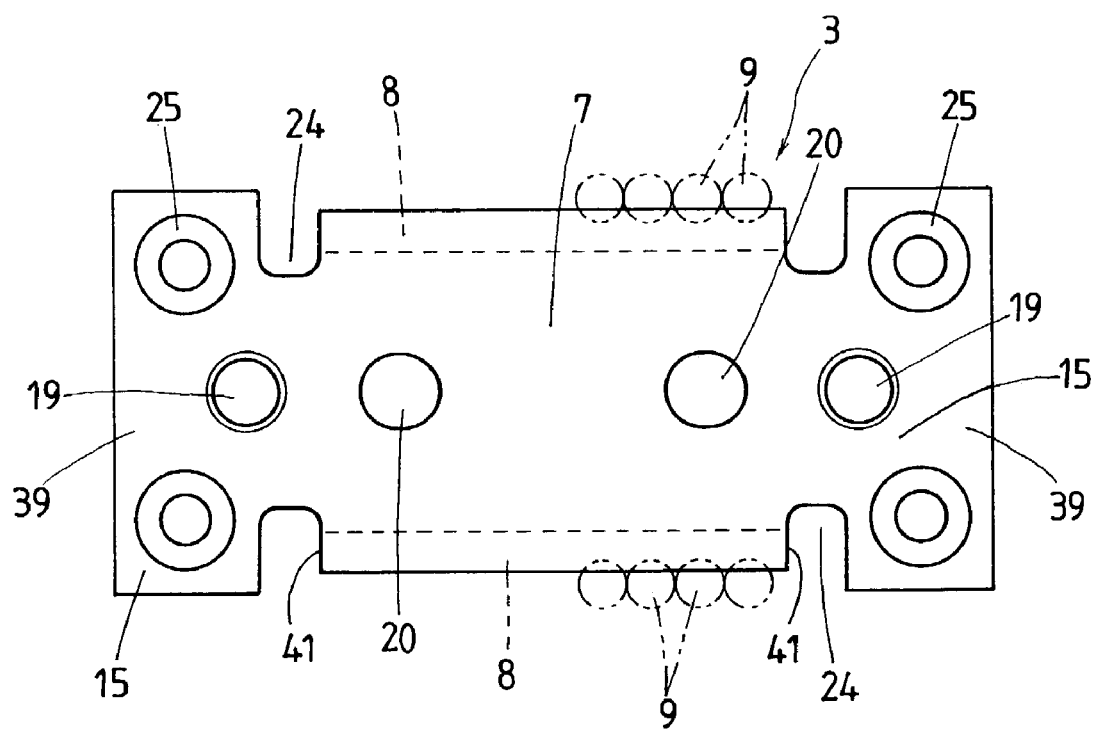
FIG. 6 is a top plan view illustrating a casing for the slider of FIG. 1.
Figure 7:
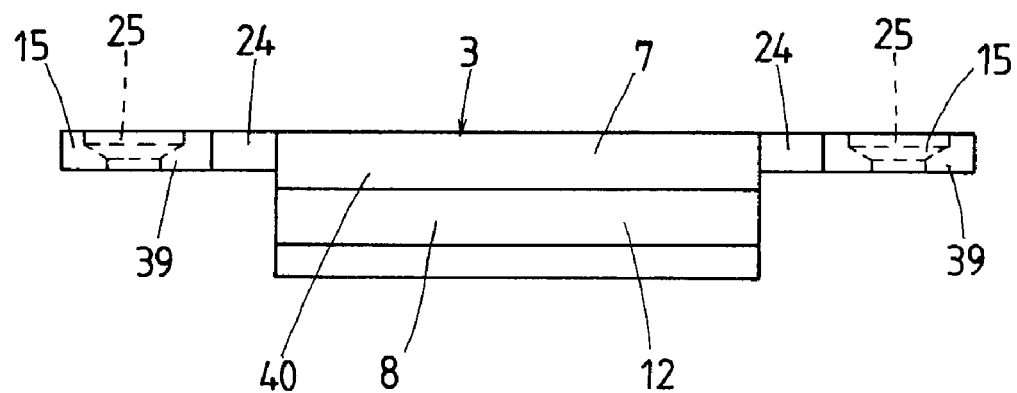
FIG. 7 is a front elevation of the casing of FIG. 6.
Figure 8:
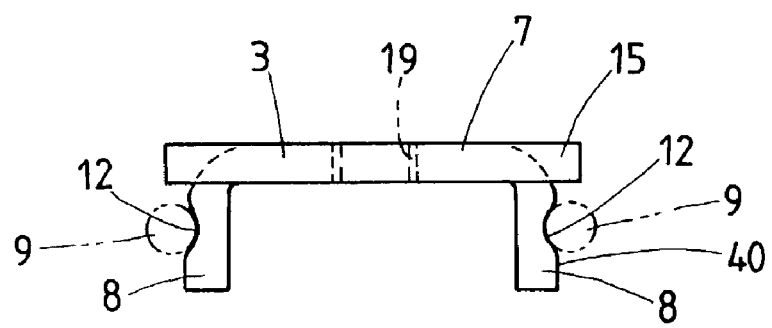
FIG. 8 is a side elevation of the casing of FIG. 7.
Figure 9:
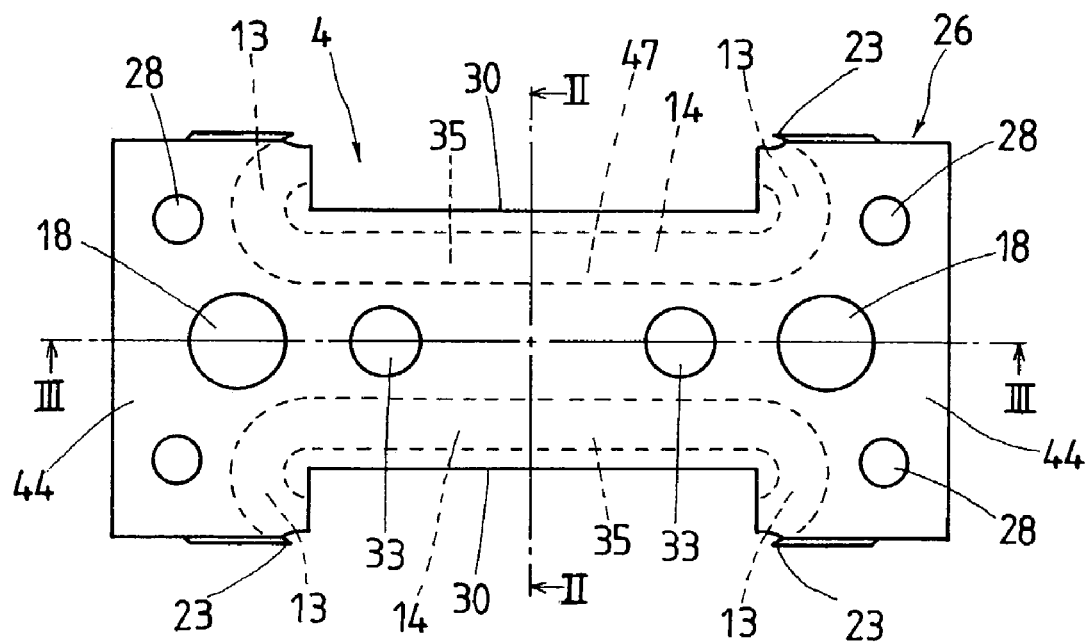
FIG. 9 is a top plan view showing a carriage, called circulator hereinafter, of the slider in the linear motion guide unit of FIG. 1, in which there is provided a non-loaded area to allow rolling elements to recirculate through there.
Figure 10:
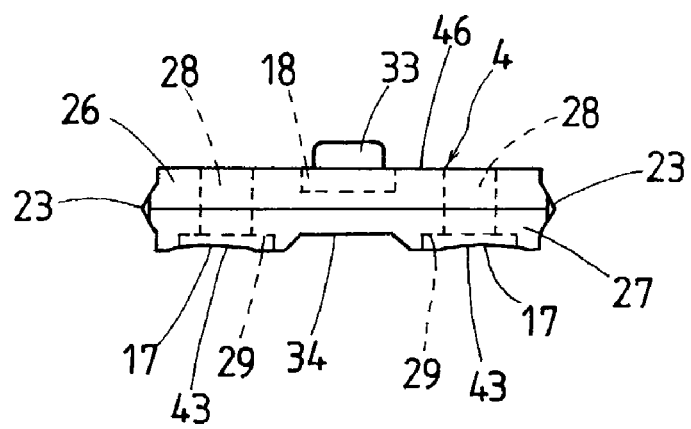
FIG. 10 is a side elevation of the circulator of FIG. 9.
Figure 11:
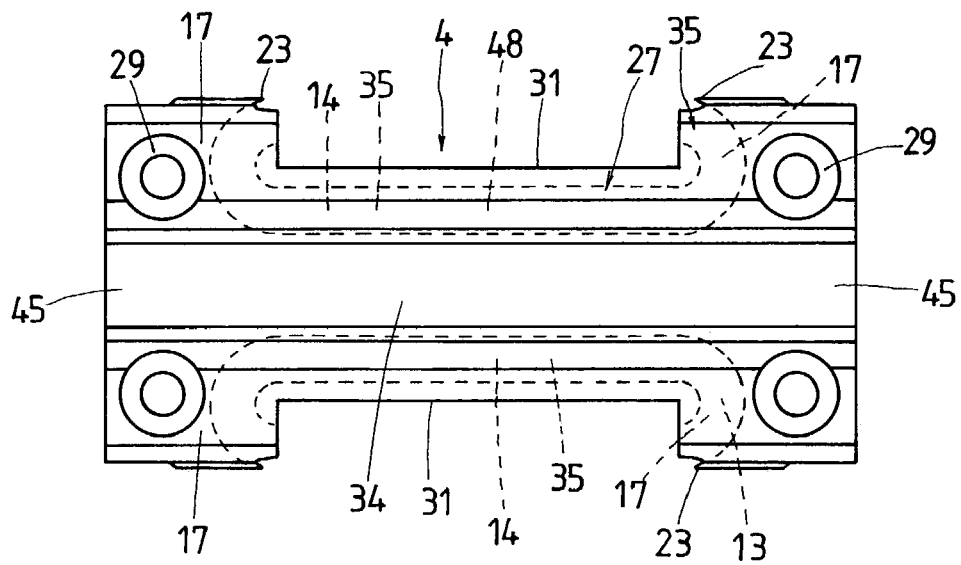
FIG. 11 is a bottom view of the circulator of FIG. 9.
Figure 12:
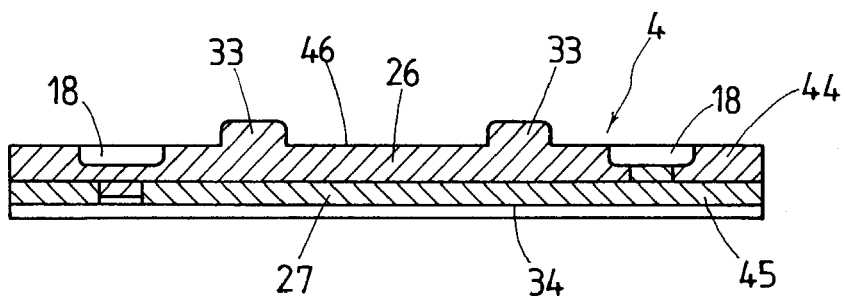
FIG. 12 is a cross section of the circulator of FIG. 9, the view being taken on a plane along a line III—III of that figure.
Figure 13:
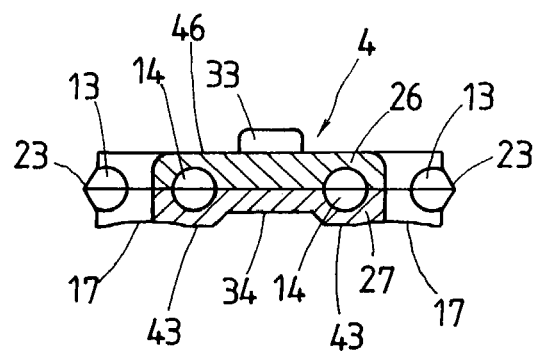
FIG. 13 is a cross section of the circulator of FIG. 9, the view being taken on a plane along a line II—II of that figure.
Figure 14:
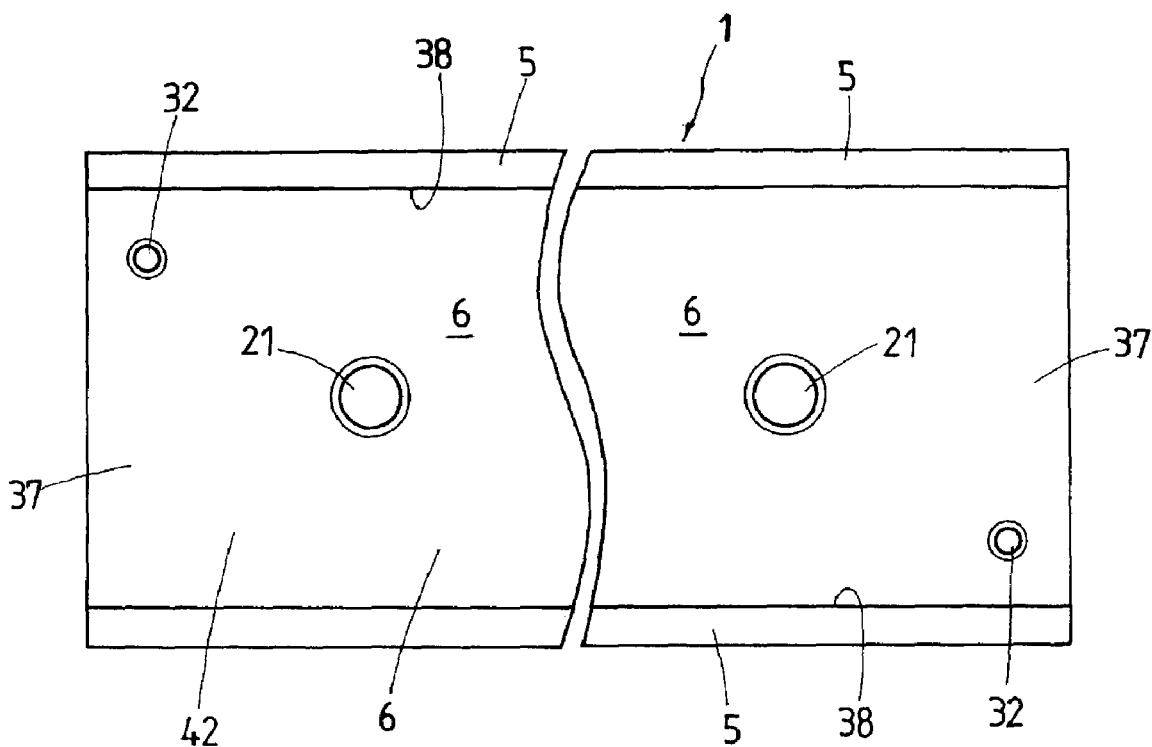
FIG. 14 is a top plan view, partially cut away, of a guide rail in the linear motion guide unit shown in FIG. 1.
Figure 15:
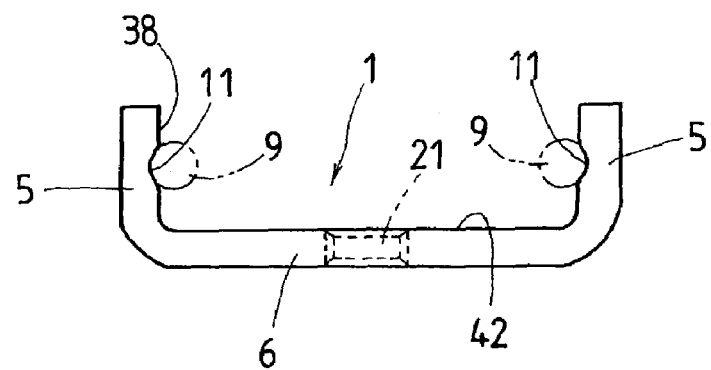
FIG. 15 is a side elevation of the guide rail of FIG. 14.

The stopper pins 16 attached to the guide rail 1, as shown in FIG. 4, are placed on the bottom 6 of the guide rail 1 along linear lines lying on traveling paths of the widthwise opposing side walls 8 of the casing 3, with located in a preselected relation to one another, in which they lie on any diagonal line of a plane surface 42 of the bottom 6 or symmetrically across 180° at lengthwise opposite ends 37 of the guide rail 1. The stopper pins 16 are installed on the guide rail 1 at the forward and aft ends 37 of the guide rail 1, one to each end, in a relation to one another where they are diagonally arranged on widthwise opposite side walls 5 of the guide rail 1, one to near each side wall. This arrangement of the stopper pins 16 as stated just earlier renders the hole-making operation to produce the threaded holes 32 in the guide rail 1 much easier and also helps make sure of better kinetic balance at the time when the slider 2 comes to rest. As an alternative, four threaded holes 32 in which the stopper pins 16 are screwed, although not shown, can be arranged at the forward and aft ends 37 of the guide rail 1, two to each end, thereby to make the kinetic balance much better. Nevertheless, just one threaded hole 32 at any one of the forward and aft ends, as shown here, would be sufficient to get the slider 2 stopping.

The slider 2 is principally composed of the casing 3 and a carriage 4 called herein circulator, which is provided therein with non-loaded areas, each of which includes therein turnarounds 13 communicating with the load raceway 10 defined between the raceway grooves 11, 12 confronting one another, and a return passage 14 connecting the turnarounds 13 with each other. The rolling elements or balls 9 are allowed to run through a recirculating circuit 35 comprised of the load raceway 10, turnarounds 13 and return passage 14. The circulator 4 is made concaved on a lower surface thereof to form sidewise opposing recesses 17 along fore-and-aft areas 17 corresponding with the stopper pins 16 so as to allow the stopper pins 16 to go by underneath the slider 2 without any interference between them. The fore-and-aft recess 17 is formed to get curved in cross section.

With the linear motion guide unit constructed as stated earlier, accordingly, the circulator 4 is allowed to travel over the stopper pins 16 without experiencing any collision against the stopper pins 16 thanks to the circulator 4 being recessed on the lower surface thereof to get clear of the stopper pins 16. This makes certain of a traveling stroke of the slider 2 relatively to the guide rail 1, which increases by as much as a lengthwise measure of forward and aft aprons 39 of the casing 3.

Where the rolling elements 9 are balls, both the turnarounds 13 and the return passages 14 have to be made circular in cross section to make sure of allowing the balls to roll smoothly through the recirculating circuits without experiencing any rattling vibration. To cope with this, the circulator 4 is usually divided into upper and lower circulator halves 26, 27 of synthetic resin to bypass any sophisticated technical requirements to produce the turnarounds 13 and the return passages 14 circular in cross section in the circulator 4. Grooves 47, 48 semicircular in cross section are cut in the upper and lower circulator halves 26, 27, respectively, and then mated with one another to complete the turnarounds 13 and the return passages 14 circular in cross section in the circulator 4. In other words, the circulator 4 is made up of the upper and lower circulator halves 26, 27 that are mated together with one another in a relation forming therein both the turnarounds 13 and the return passages 14, which are circular in cross section.

The circulator 4 made of synthetic resin, even if having come into collision against the stopper pin 16 of the guide rail 1 while on sliding travel of the slider 2 relatively to the guide rail 1, would be damaged. To refrain this obstacle, the lower circulator half 27 is made concaved at 17 on sidewise spaced lower surfaces 43 to allow the stopper pin 16 to pass through below the circulator 4 without coming into interference with the lower circulator half 27.

The circulator 4 is receded sidewise inwardly at 30, 31 to fit over or conform to the side walls 8 of the casing 3 to join it together with the casing 3. That is to say, the upper circulator half 26 is recessed inwardly over the middle areas 30 of the widthwise opposing sides save the lengthwise opposite ends 44 while the lower circulator half 27 is also recessed inwardly over the middle areas 31 of the widthwise opposing sides save the lengthwise opposite ends 45. Thus, the side walls 8 of the casing 3 can fit in the recessed middle areas 30, 31 save for the forward and aft ends 44, 45 of the circulator 4 to join the casing 3 with the circulator 4.

Moreover, the upper and lower circulator halves 26, 27 have claw halves 23, respectively. Once the upper and lower circulator halves 26, 27 has been mated with one another, the claw halves 23 merge together with one another into the complete claw 23 to make sure of smooth running of the rolling elements 9 at boundaries between the load raceways 10 and the associated turnarounds 13.

The casing 3 is made therein with holes 20 that are used to align and position the circulator 4 thereto. In order to assemble the casing 3 integrally with the circulator 4 at a precise position relative to the circulator 4, a tenon 33 raised above a top surface of the upper circulator half 26 for the circulator 4 fits in the associated hole 20 in the casing 3.

The stopper pin 16 for the stopper construction 36 is a screw of a pan head having a rounded surface of the top of the head. This rounded top of the pan head screw 16 is expected to disperse well an impact force that might occur due to any possible collision of the fore-and-aft ends 41 of the casing 3 against their associated stopper pins 16. Thus, even relatively small pin would be expected to serve well for absorbing the kinetic energy of the slider 2.

The threaded hole 32 made in the guide rail 1 to fit on the stopper pin 16 doubles as a threaded hole used to fasten the guide rail 1 to any stationary structure including a machine bed and so on. Besides the threaded hole 32 for the stopper pin 36, the guide rail 1 is made with other threaded holes 21 to fasten the guide rail 1 to any stationary structure including a machine bed and so on. Correspondingly, the lower circulator half 27 of the circulator 4 is provided underneath the lower surface thereof with a fore-and-aft recess 34, which lies sidewise midway area to allow fastening screws fit in the guide rail 1 to pass through below the circulator 4 without encountering any interference with the lower circulator half 27. The slider 2 is also made with threaded holes 19 used to fasten any parts including works and so on thereto.

The forward and aft aprons 39 of the casing 3 have holes 25 used for riveting or caulking, which are made at preselected locations 15, for example four corners in the embodiment shown herein, in alignment with holes 28 made in the circulator 4, which are also arranged at preselected locations, for example four corners shown in figures. The casing 3 is joined together with the circulator 4 with rivets that fit in the holes 25 of the casing 3 and the holes 28, 29 of the circulator 4, followed by experiencing riveting.

The guide rail 1, as shown in FIG. 1, is made with the threaded holes 21 that are used to fasten the guide rail 1 to the stationary structure including a machine bed and so on. Where the screws to fasten the guide rail 1 to the stationary structure are allowed to fit in the threaded holes 21 from the side of the stationary structure, the screws come into engagement with the threaded holes 21 to clamp the guide rail 1 together with the stationary structure. In contrast, where the screws are permitted to access to the guide rail 1 from only the opposite side or the side of the slider 2, they extend simply through the threaded holes 21 in the guide rail 1 to be mated with any threaded holes in the stationary structure to tighten the guide rail 1 on the stationary structure. In the latter case stated just above, the screw is made smaller in diameter than the inside caliper of the threaded hole 21 in the guide rail 1. The screws driven from the plane surface 42 of the guide rail 1 can not bypass the fatal matter that the screw heads rise above the plane surface 42 of the bottom 6 of the guide rail 1. To deal with this matter, the lower circulator half 27 of the circulator 4 is made underneath the lower surface thereof with the lengthwise recess 34, which lies sidewise midway area to allow fastening screws fit in the guide rail 1 to pass through below the circulator 4 without causing any interference with the lower circulator 4.

The casing 3 of the slider 2 is provided therein with the threaded holes 19 that are used to fasten any parts including works and so on. That is, the threaded holes 19 serve as fastening holes to mount the parts including works, small articles and so on to the slider 2. Moreover, the upper circulator half 26 of the circulator 4 just below the casing 3 is made in an upper surface thereof with holes 18, which are arranged in alignment with the threaded holes 19 of the casing 3. Thus, the fastening screws, if should extend downwards out of the threaded holes 19 beyond the casing 3, are permitted fit in the associated holes 18 in the circulator 4, without causing any interference with calculator 4.

The following will explain how to fasten the casing 3 to the circulator 4 to complete the slider 2 of an assemblage of the casing 3 with the circulator 4.

The circulator 4 is joined together with the casing 3 in a way the side walls 8 of the casing 3 fit in the sidewise recesses 30, 31 of the circulator 4, one to each recess, while the tenons 33 raised above a top surface 46 of the upper circulator half 26 fit in the holes 20 of the casing 3 to align and position the circulator 4 to the casing 3, thereby bringing the holes 28, 29 for fastening at four corners of the circulator 4 into perfect alignment with the holes 25 for riveting at four corners of the casing 3. Then, aluminum rivets are placed to pass through the aligned holes 28, 29 and 25, and manipulated by riveting operation to produce rivet fastenings 22 to grip the casing 3 together with the circulator 4. Further, the rolling elements 9 are charged into the recirculating circuits 35. Thereafter, the slider 2 is brought into combination with the guide rail 1 while keeping the rolling elements 9 against falling apart from one another. As an alternative, the slider 2 can be combined with the guide rail 1 prior to being charged with the rolling elements 9. The stopper pins 16 are finally driven in the threaded holes 32 to finish assemblage of the linear motion guide unit.

With the linear motion guide unit constructed as stated earlier, the stopper construction 36 may be provided by just the stopper pin 16 that simply fit in the threaded hole 19 in the guide rail 1. While making the linear motion guide unit itself less in space and compact in construction, the stopper construction made so as to allow the stopper pin 16 to attach and detach easily it from the guide rail 1 can make certain of keeping the slider 2 against untethered from the guide rail 1. Since the stopper pin 16 can be attached and detached from the guide rail 1 with easy work of just screwing in and out the stopper pin 16, the slider 2 is simply replaced for new one with respect to the guide rail 1. Fitting relation of the slider 2 in the guide rail 1, for example, may be altered easily.

The slider 2 sometimes has become untethered from the guide rail 1 while on a linear movement and the rolling elements have come apart out of the slider 2. Thus, the stopper construction for the linear motion guide unit of the present invention is envisaged to make sure of preventing the slider 2 from escape out of the guide rail 1, thereby keeping the rolling elements against coming apart away from one another.

As the present invention may be embodied in several forms without departing from the spirit of essential characteristics thereof, the present embodiments are therefore illustrative and not restrictive, since the scope of the invention is defined by the appended claims rather than by the description preceding them, and all changes that fall within meets and bounds are therefore intended to embraced by the claims.

What is claimed is:

1. A linear motion guide unit comprising: a guide rail plate member formed to have a bottom and first side walls extending lengthwise along widthwise opposite sides of the bottom, one to each side, the first side walls being made on their inside surfaces with first raceway grooves extending lengthwise, one to each inside surface, and a slider fit for linear movement in between the first side walls widthwise opposite to one another, the slider being provided on sidewise outside surfaces thereof with second raceway grooves, one to each outside surface, which are in opposition to the first raceway grooves to define load raceways between them to allow rolling elements to run through there, whereby the slider is movable in a sliding manner between the first side walls of the guide rail by virtue of the rolling elements;

whereby a stopper construction is installed detachably to any one of forward and aft ends of the guide rail once the slider has fit in the guide rail, so that the slider comes into abutment against the stopper construction while on a movement, thereby being prevented from becoming untethered from the guide rail, wherein the slider has a casing of a plate formed in an U-shape in cross section, which is composed of a top portion and second side walls bent along widthwise opposite sides of the top portion to head downwards, wherein the second raceway grooves are cut in sidewise outside surfaces of the second side walls, wherein the slider is composed of the casing and a circulator laid underneath the casing, which is provided therein with non-loaded areas, each of which includes therein turnarounds communicating with the associated load raceway defined between the raceway grooves confronting one another, and a return passage connecting the turnarounds with each other, wherein the rolling elements are allowed to run through a recirculating circuit comprised of the load raceway, turnarounds and return passage, and wherein the circulator is comprised of upper and lower circulator halves of synthetic resin, which are made therein with grooves semicircular in cross section to produce the turnarounds and the return passages that are circular in cross section to render them suitable for the rolling elements of balls wherein the circulator is made concaved on a lower surface thereof to form a recess extending along a fore-and-aft area corresponding with the stopper pin for the stopper construction so as to allow the stopper pin to go by underneath the slide without any interference between them.

2. A linear motion guide unit comprising: a guide rail plate member slim in thickness formed to have a bottom and first side walls extending lengthwise along widthwise opposite sides of the bottom, one to each side, the first side walls being made on their inside surfaces with first raceway grooves extending lengthwise, one to each inside surface, and a slider fit for linear movement in between the first side walls widthwise opposite to one another, the slider being provided on sidewise outside surfaces thereof with second raceway grooves, one to each outside surface, which are in opposition to the first raceway grooves to define load raceways between them to allow rolling elements to run through there, whereby the slider is movable in a sliding manner between the first side walls of the guide rail by virtue of the rolling elements;

whereby a stopper construction is installed detachably to any one of forward and aft ends of the guide rail once the slider has fit in the guide rail, so that the slider comes into abutment against the stopper construction while on a movement, thereby being prevented from becoming untethered from the guide rail, wherein the slider has a casing of a thin plate formed in an U-shape in cross section, which is composed of a top portion and second side walls bent along widthwise opposite sides of the top portion to head downwards, wherein the second raceway grooves are cut in sidewise outside surfaces of the second side walls, wherein the slider is composed of the casing and a circulator laid underneath the casing, which is provided therein with non-loaded areas, each of which includes therein turnarounds communicating with the associated load raceway defined between the raceway grooves confronting one another, and a return passage connecting the turnarounds with each other, wherein the rolling elements are allowed to run through a recirculating circuit comprised of the load raceway turnarounds and return passage, and wherein the circulator is made concaved on a lower surface thereof to form a recess extending along a fore-and-aft area corresponding with the stopper pin for the stopper construction so as to allow the stopper pin to go by underneath the slider without any interference between them.

3. A linear motion guide unit constructed as defined in claim 2 wherein the stopper construction is comprised of a stopper pin that fits in any one of a hole and a threaded hole formed in a plane surface of the bottom of the guide rail, with a part of the stopper pin being raised above the hole.

4. A linear motion guide unit constructed as defined claim 3 wherein the stopper pin for the stopper construction is installed to the guide rail in relation to bear against any one end of the second side walls of the casing, so that the slider comes to rest to be kept against becoming untethered from the guide rail whole on a movement.

5. A linear motion guide unit constructed as defined claim 3 wherein the stopper pin for the stopper construction is a screw of a pan head having a rounded surface of the top of the head.

6. A linear motion guide unit constructed as defined in claim 3 wherein the threaded hole made in the guide rail to fit on the stopper pin doubles as a threaded hole used to fasten the guide rail to any stationary structure including a machine bed.

7. A linear motion guide unit constructed as defined claim 2 wherein the stopper pins for the stopper construction attached to the guide rail are placed on the bottom of the guide rail along linear lines lying on traveling paths of the widthwise opposing second side walls of the casing, located in a preselected relation to one another, in which they lie on any diagonal line of the plane surface of the bottom at lengthwise opposite ends of the guide rail.

8. A linear motion guide unit constructed as defined claim 2 wherein the fore-and-aft concaved surface provided on the lower surface of the circulator lies sidewise midway area to cause no interference with a screw that is used to fasten the guide rail to any stationary structure including a machine bed.

9. A linear motion guide unit constructed as defined in claim 2 wherein the slider is made with a threaded hole used to fasten any part including works thereto.

10. A linear motion guide unit constructed as defined claim 2 wherein the casing is integrated with the circulator in a way that the widthwise opposite second side walls of the casing fit in sidewise recesses of the circulator, one to each recess, which are made over the middle areas of the widthwise opposing sides save the lengthwise opposite ends of the circulator.

11. A linear motion guide unit constructed as defined claim 2 wherein the casing is positioned in alignment with the circulator in a way that a hole made in the casing fits over a tenon raised above a top surface of the circulator.

12. A linear motion guide unit constructed as defined claim 2 wherein the circulator has a hole while the casing has a hole used for riveting, which is made in alignment with the hole in the circulator, and wherein the casing is joined together with the circulator, using riveting.

* * * * *